(12) United States Patent
Xu et al.

(10) Patent No.: US 11,296,531 B2
(45) Date of Patent: Apr. 5, 2022

(54) CHARGING APPARATUS, CHARGING SYSTEM AND CHARGING CONTROL METHOD

(71) Applicants: GREE ELECTRIC APPLIANCES (WUHAN) CO., LTD., Wuhan (CN); GREE ELECTRIC APPLIANCES, INC. OF ZHUHAI, Zhuhai (CN)

(72) Inventors: Pengfei Xu, Zhuhai (CN); Guihua Yin, Zhuhai (CN); Ping Yang, Zhuhai (CN); Zhen Liu, Zhuhai (CN); Long Zhang, Zhuhai (CN)

(73) Assignees: Gree Electric Appliances (Wuhan) Co., LTD., Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 159 days.

(21) Appl. No.: 16/622,504

(22) PCT Filed: Jun. 20, 2018

(86) PCT No.: PCT/CN2018/092015
§ 371 (c)(1),
(2) Date: Dec. 13, 2019

(87) PCT Pub. No.: WO2019/029276
PCT Pub. Date: Feb. 14, 2019

(65) Prior Publication Data
US 2021/0152005 A1    May 20, 2021

(30) Foreign Application Priority Data
Aug. 8, 2017 (CN) .......................... 201710672612.9

(51) Int. Cl.
*H02J 7/00* (2006.01)

(52) U.S. Cl.
CPC ........ *H02J 7/0071* (2020.01); *H02J 7/00034* (2020.01); *H02J 2310/22* (2020.01)

(58) Field of Classification Search
None
See application file for complete search history.

(56) References Cited

U.S. PATENT DOCUMENTS

| 8,242,742 B2 * | 8/2012 | Kao | ...................... | H02J 7/0021 320/114 |
| 2010/0052620 A1 * | 3/2010 | Wong | .................... | H02J 7/0036 320/137 |

(Continued)

FOREIGN PATENT DOCUMENTS

| CN | 104505552 A | 4/2015 |
| CN | 106487045 A | 3/2017 |

(Continued)

OTHER PUBLICATIONS

International Search Report for International Application No. PCT/CN2018/092015, dated Aug. 31, 2018, 2 pages.

*Primary Examiner* — Arun C Williams
(74) *Attorney, Agent, or Firm* — Armstrong Teasdale LLP

(57) ABSTRACT

A charging apparatus, a charging system, and a charging control method are provided. The charging apparatus includes: a transforming element and output interfaces, and further includes a charging control element and a maximum output power control element. The charging control element is connected with the maximum output power control element, and the charging control element identifies a target charging mode selected by a user and sends the target charging mode to the maximum output power control element. The maximum output power control element is connected with the transforming element, and the maximum output power control element determines a target maximum output power corresponding to the target charging mode (Continued)

according to a pre-saved correspondence relationship between each charging mode and each maximum output power. The transforming element is connected with the output interface, and the transforming element obtains a target output power according to the target maximum output power and charges a charging device through the output interfaces by using the target output power.

14 Claims, 6 Drawing Sheets

(56) References Cited

U.S. PATENT DOCUMENTS

| | | | | |
|---|---|---|---|---|
| 2013/0009599 | A1* | 1/2013 | Yukizane | H02J 13/0062 320/109 |
| 2013/0119922 | A1* | 5/2013 | Chen | H02J 7/0069 320/107 |
| 2015/0120109 | A1* | 4/2015 | Cun | B60L 53/665 701/22 |
| 2016/0285277 | A1* | 9/2016 | Joehren | H02J 5/005 |

FOREIGN PATENT DOCUMENTS

| | | |
|---|---|---|
| CN | 207304114 U | 5/2018 |
| JP | 2009273219 A | 11/2009 |

\* cited by examiner

… (1, 2)

CHARGING APPARATUS, CHARGING SYSTEM AND CHARGING CONTROL METHOD

CROSS-REFERENCE TO RELATED APPLICATIONS

This application is the national stage entry of PCT/CN2018/092015, filed on Jun. 20, 2018, which claims priority to Chinese Patent Application Charging Apparatus, Charging System and Charging Control Method No. 201710672612.9, filed on Aug. 8, 2017, contents of which are hereby incorporated by reference in their entirety.

TECHNICAL FIELD

The present disclosure relates to the field of electronic technology, and in particular to a charging apparatus, a charging system and a charging control method.

BACKGROUND

With the rapid development of electronic technology, fast charging technology predominates charging of the current mobile terminal industry. Moreover, because the fast charging technology greatly shortens a charging time period, it is greatly convenient for users to use mobile terminals during the day or in an emergency.

However, a method known to inventors that a charging power output by a charging apparatus is controlled by a charging device. That is, the charging device sends a preset output power saved in the charging device to the charging apparatus, and the charging apparatus charges the charging device according to the received output power. Generally, the output power saved in the charging device is pre-specified by developers, and the users may not adjust the output power, so in the evening or when the users do not use the charging device, and the charging device is in a charging state for a long time, the charging device is recharged for many times after being charged full. A service life of a battery in the charging device is related to the number of charging times. Repeated recharging will influence the service life of the battery to some extent, and then influence the service life of the charging device.

Therefore, when the charging apparatus is configured to charge the charging device, the output power of the charging device is fixed, and the possible occurrence of repeated recharging will shorten the service life of the charging device.

SUMMARY

At least some embodiments of the present disclosure provide a charging apparatus, a charging system and a charging control method, so as at least to partially solve a problem in the related art of the occurrence of repeated recharging which reduces the service life of charging device.

In some embodiments of the present disclosure, a charging apparatus is provided. The charging apparatus includes: a shell, a transforming element arranged in the shell, and output interfaces arranged on the shell. The charging apparatus further includes: a charging control element and a maximum output power control element which are arranged in the shell.

The charging control element is connected with the maximum output power control element, and the charging control element is configured to identify a target charging mode selected by a user and sends the target charging mode to the maximum output power control element.

The maximum output power control element is connected with the transforming element, and the maximum output power control element is configured to determine a target maximum output power corresponding to the target charging mode according to a pre-saved correspondence relationship between each charging mode and each maximum output power.

The transforming element is connected with the output interfaces, and is configured to be connected with a power supply. The output interfaces are configured to be connected with a charging device. The transforming element is configured to obtain a target output power corresponding to the target charging mode according to the target maximum output power and charges the charging device through the output interfaces by using the target output power.

In some embodiments of the present disclosure, a charging system is provided. The system includes the charging apparatus and the charging device connected with the charging apparatus.

In some embodiments of the present disclosure, a charging control method based on the charging apparatus is provided. The method includes the following operations.

The charging control element identifies the target charging mode selected by a user.

The maximum output power control element determines the target maximum output power corresponding to the target charging mode according to the pre-saved correspondence relationship between each charging mode and each maximum output power.

The transforming element obtains the target output power corresponding to the target charging mode according to the target maximum output power, and charges the charging device through the output interfaces by using the target output power.

At least some embodiments of the present disclosure provide a charging apparatus, a charging system and a charging control method. The charging apparatus includes: the shell, the transforming element arranged in the shell, and the output interfaces arranged on the shell. The charging apparatus further includes: the charging control element and the maximum output power control element which are arranged in the shell. The charging control element is connected with the maximum output power control element, and the charging control element identifies the target charging mode selected by the user and sends the target charging mode to the maximum output power control element. The maximum output power control element is connected with the transforming element, and the maximum output power control element determines the target maximum output power corresponding to the target charging mode according to the pre-saved correspondence relationship between each charging mode and each maximum output power. The transforming element is connected with the output interfaces, and is configured to be connected with the power supply. The output interfaces are configured to be connected with the charging device. The transforming element obtains the target output power corresponding to the target charging mode according to the target maximum output power and charges the charging device through the output interface by using the target output power. The charging apparatus provided in some embodiments of the present disclosure includes the charging control element and the maximum output power control element. The charging control element sends the identified target charging mode selected by the user to the maximum output power control element. The maximum output power control element determines the target maximum output power according to the target charging mode. The transforming element obtains the target output power corresponding to the target charging mode according to the target maximum output power, and charges the charging device through the output interface by using the target output power. In such a manner, the occurrence of repeated recharging is prevented to some extent, and the service life of charging device is prolonged.

BRIEF DESCRIPTION OF THE DRAWINGS

In order to more clearly illustrate the technical solution in some embodiments of the present disclosure or the method known to the inventors, the accompanying drawings provided in description of the embodiments or the method known to the inventors are simply introduced below. It is apparent that the accompanying drawings in the following description are some embodiments of the present disclosure, for the ordinary skill in the art, some other accompanying drawings are also obtained according to these on the premise of not contributing creative effort.

DETAILED DESCRIPTION

To prolong the service life of charging device, at least some embodiments of the present disclosure provide a charging apparatus, a charging system and a charging control method.

In order to make the purpose, technical solutions and advantages of the present disclosure clearer, the present disclosure will be further described below in combination with the drawings in detail. Obviously, it is apparent that the described embodiments are a part of the embodiments of the present disclosure but not all. On the basis of some embodiments of the present disclosure, all other embodiments obtained on the premise of no creative work of those skilled in the art fall within the protection scope of the present disclosure.

First Embodiment

Figure 1:
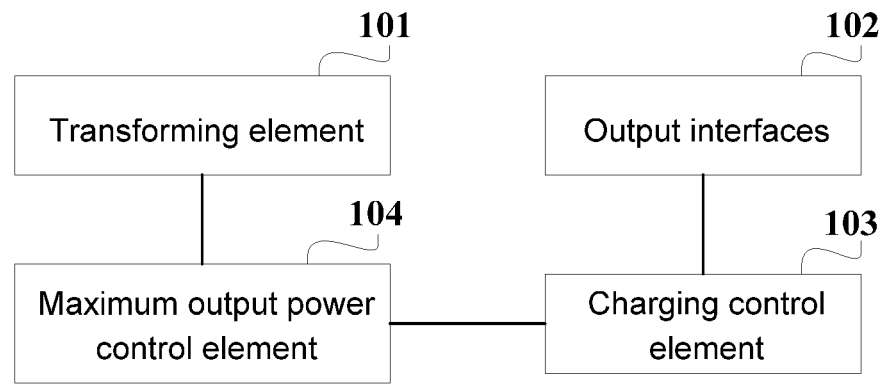
FIG. 1 is a structural schematic diagram of a charging apparatus according to a first embodiment of the present disclosure.

FIG. 1 is a structural schematic diagram of a charging apparatus according to an embodiment of the present disclosure. The charging apparatus includes: a shell, a transforming element 101 arranged in the shell, and output interfaces 102 arranged on the shell. The charging apparatus further includes: a charging control element 103 and a maximum output power control element 104 which are arranged in the shell.

The charging control element 103 is connected with the maximum output power control element 104, and the charging control element 103 identifies a target charging mode selected by a user and sends the target charging mode to the maximum output power control element 104.

The maximum output power control element 104 is connected with the transforming element 101, and the maximum output power control element 104 determines a target maximum output power corresponding to the target charging mode according to a pre-saved correspondence relationship between a charging mode and a maximum output power, and sends the target maximum output power to the transforming element 101.

The transforming element 101 is connected with the output interfaces 102, and is configured to be connected with a power supply. The output interfaces 102 are configured to be connected with a charging device. The transforming element 101 obtains a target output power corresponding to the target charging mode according to the target maximum output power and charges the charging device through the output interfaces 102 by using the target output power.

Specifically, the charging apparatus includes the shell. The transforming element 101, the charging control element 103 and the maximum output power control element 104 are arranged in the shell. The output interfaces 102 are arranged on the shell, and are configured to be connected with the charging device.

The user selects the target charging mode through a mode selection button according to the charging apparatus. The mode selection button is arranged on the shell of the charging apparatus. The mode selection button arranged on the shell is not shown in the FIG. 1. It is possible to arrange one mode selection button to realize the mode selection through different tap positions, or arrange one mode selection button corresponding to each charging mode, that is, multiple mode selection buttons are arranged on the shell. For example, the multiple mode selection buttons respectively corresponding to a fast charging mode, a slow charging mode, and a standard charging mode is arranged on the shell of the charging apparatus.

When the user selects the target charging mode through the charging mode selection button arranged on the shell of the charging apparatus, the charging control element 103 is connected with the mode selection button, identifies the target charging mode selected by the user according to the mode selection button selected by the user, and sends the target charging mode selected by the user to the maximum output power control element 104. The charging modes provided in some embodiments of the present disclosure include the fast charging mode, the slow charging mode, the standard charging mode, and the like. The target output powers respectively correspond to the different charging modes. Correspondingly, the required charging durations of using the different charging modes to charge the charging device full are different.

The target output powers respectively correspond to the different charging modes. Correspondingly, the required charging durations of using the different charging modes to charge the charging device full are different. When the charging modes in some embodiments of the charging apparatus include the fast charging mode, the slow charging mode, and the standard charging mode, the target output power in the fast charging mode is maximum, and the required duration of charging the charging device full is shortest, so the user selects the fast charging mode to charge the charging device in case of emergency. The target output power in the standard charging mode takes the second place, and the required duration of charging the charging device full takes the second place, so the user selects the standard charging mode to charge the charging device during normal use. The target output power in the slow charging mode is minimum, and the required duration of charging the charging device full is longest, so the user selects the slow charging mode to charge the charging device in the evening or leisure time. Through above embodiments of the present disclosure, the repeated recharging which reduces the service life of the charging device is prevented. In some embodiments of the present disclosure, the charging device is a device to be charged through the charging apparatus, for example, a Personal Computer (PC) or a mobile terminal.

The maximum output power control element 104 determines the target maximum output power corresponding to the target charging mode according to the pre-saved correspondence relationship between each charging mode and each maximum output power. The maximum output power control element 104 saves the same maximum output power corresponding to each charging mode, or saves the different maximum output powers corresponding to each charging mode.

In some specific implementation processes, the functions of the charging control element and the maximum output power control element are implemented by a chip. Different pins of the chip are connected with the corresponding mode selection button, and the chip saves a correspondence relationship between each mode selection button and each charging mode. The target charging mode is determined according to the mode selection button selected by the user. Meanwhile, the chip saves the correspondence relationship between the charging mode and the maximum output power. After the target charging mode is determined, the target maximum output power corresponding to the target charging mode is determined.

Specifically, during a charging process, in the correspondence relationship between the charging mode and the maximum output power which is pre-saved corresponding to each charging mode in the maximum output power control element of the charging apparatus, the maximum output power corresponding to each charging mode is the target output power corresponding to the charging mode. When the target maximum output power is the target output power corresponding to the target charging mode, the transforming element 101 determines the target maximum output power as the target output power.

That is, the correspondence relationship between each charging mode and the output power corresponding to this charging mode for charging the charging device is pre-saved in the maximum output power control element. After the target charging mode is determined, the target maximum output power corresponding to the target charging mode is used for charging the charging device. Therefore, at this time, the transforming element directly takes the target maximum output power as the target output power, and charges the charging device through the output interface by using the target output power.

Specifically, when the charging device is charged, after the maximum output power is determined, a charging frequency is determined according to the maximum output power. According to the charging frequency, a corresponding charging current is determined, and the charging device is charged by using the charging current and a charging voltage obtained after voltage reduction. Therefore, in some embodiments of the present disclosure, the transforming element 101 determines a target frequency according to the target maximum output power, determines a target charging current according to the target frequency, and obtains a target charging voltage after converting and reducing a voltage input by the power supply. The target charging current and the target charging voltage correspond to the target output power. The transforming element 101 outputs the target output power corresponding to the target charging mode, and charges the charging device through the output interface 102 by using the target output power. The target charging voltage is the voltage allowed by the charging device when the charging device is charged. A voltage value of the target charging voltage is the same as the voltage value during charging the charging device in the method known to the inventors.

The output interfaces 102 are existing interfaces like a Micro Universal Serial Bus (USB) interface or a USB Type C interface. Certainly, the existing interfaces are replaced other forms of interfaces.

For example, the output interfaces are also contact points. A charging interface corresponding to the contact point is arranged on the shell of the charging device. When charging the charging device through the output interfaces 102, the charging apparatus is connected with the charging interface of the charging device through the contact points connected with the output interfaces 102, and then charges the charging device.

Or, the output interfaces 102 arranged on the shell of the charging apparatus are represented by the contact points. The charging apparatus is connected with the charging interfaces of the charging device through the output interface 102 or the contact points, and then charges the charging device.

In the charging apparatus, the voltage and the current are adjusted through a coil ratio of the transformer in the transforming element 101, and the number of turns of the coil is generally fixed, the current is adjusted by converting the frequency, and then the target output power corresponding to the target charging mode is provided to the charging device through the output interfaces 102 according to the adjusted target charging current and the target charging voltage after voltage reduction.

Figure 2:
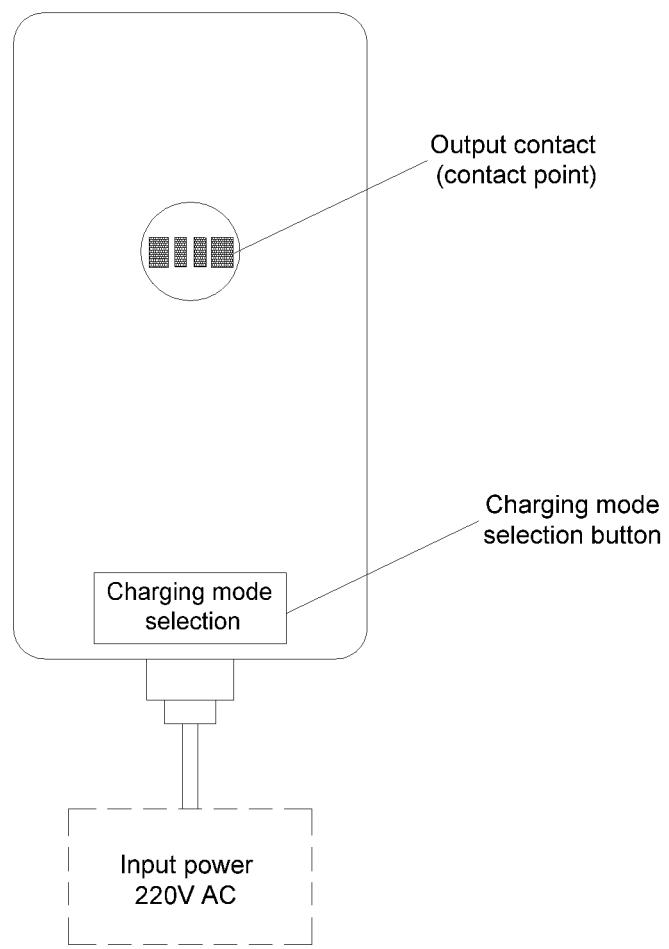
FIG. 2 is a structural schematic diagram of a charging apparatus according to a first embodiment of the present disclosure.
Figure 3:
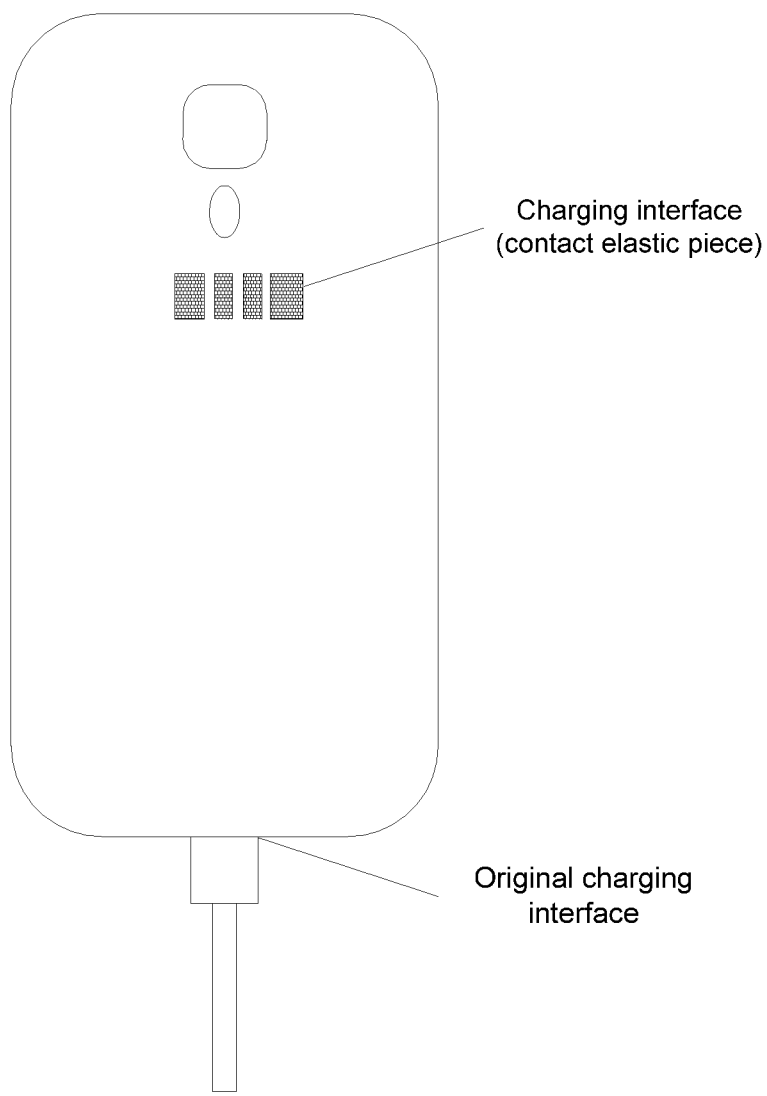
FIG. 3 is a structural schematic diagram of a charging device according to a first embodiment of the present disclosure.
Figure 4:
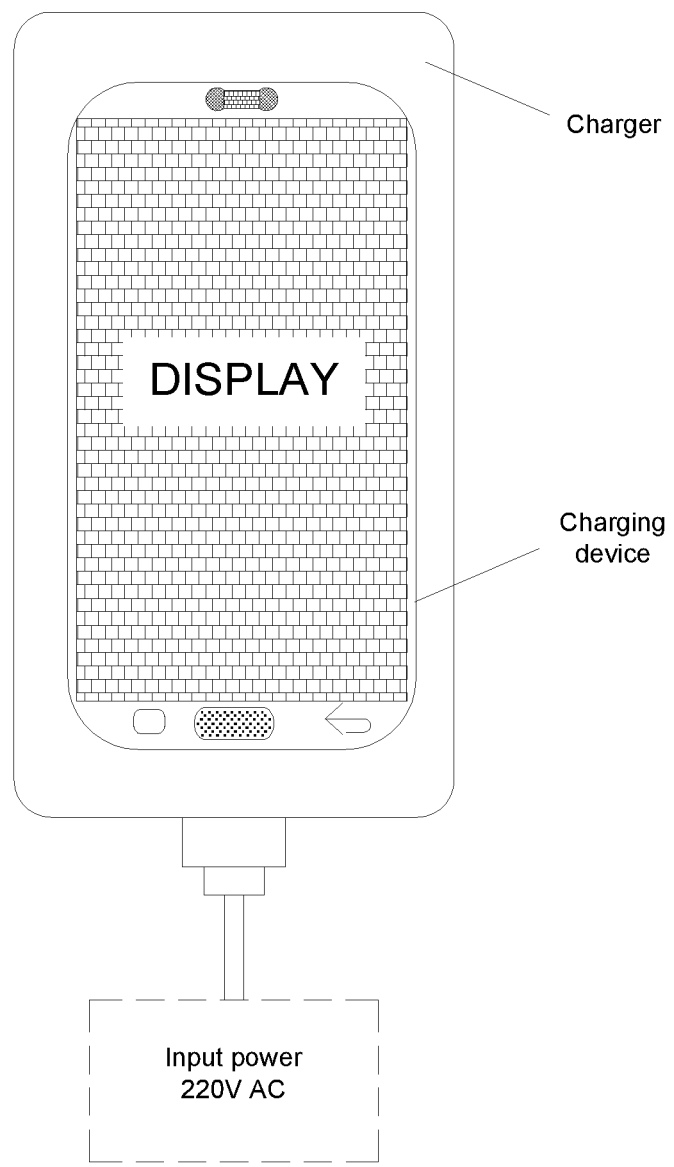
FIG. 4 is a schematic diagram of connection between a charging apparatus and a charging device according to a first embodiment of the present disclosure.

FIG. 2 is a structural schematic diagram of the charging apparatus according to an embodiment of the present disclosure. As shown in FIG. 2, the charging apparatus is connected with the power supply, the input power supply is 220V Alternating Current (AC), and the charging mode selection button is arranged at the lower part of the shell of the charging apparatus (as illustrated in FIG. 2). The user selects the target charging mode through the charging mode selection button. There is also an output interface arranged on the shell of the charging device. The output interface is represented by the contact point as shown in FIG. 2. An illustration is given by taking that the charging device is a mobile terminal for example. The charging interface corresponding to the output interface is arranged on the shell of the charging device. The charging interface of the charging device is marked by a contact elastic piece as shown in FIG. 3. As illustrated in FIG. 3, the original Micro USB interface or the USB Type C interface for charging on the charging apparatus is retained. As illustrated in FIG. 4, when the charging interface of the charging device is connected with the output interface of the charging apparatus, the charging apparatus charges the charging device.

The above embodiment is a structural schematic diagram that the charging apparatus charges the charging device. The specific shape of the shell of the charging apparatus is not limited in some embodiments of the disclosure. All shapes of the shell of the charging apparatus that charges the charging device according to the solution in some embodiments of the present disclosure shall fall within the protection scope of some embodiments of the present disclosure.

The charging apparatus provided in some embodiments of the present disclosure includes the charging control element and the maximum output power control element. The charging control element sends the identified target charging mode selected by the user to the maximum output power control element. The maximum output power control element determines the target maximum output power according to the target charging mode. The transforming element obtains the target output power corresponding to the target charging mode according to the target maximum output power, and charges the charging device through the output interfaces by using the target output power. In such a manner, the occurrence of repeated recharging is prevented to some extent, and the service life of charging device is prolonged.

Second Embodiment

In the maximum output power control element 104 of some embodiments of the present disclosure, the target maximum output power saved corresponding to the target charging mode is equal or unequal to the actual target output power for charging. When the target maximum output power is not the target output power corresponding to the target charging mode, the transforming element 101 adjusts the target maximum output power to the target output power under the control of the charging control element 103, so as to charge the charging device through the output interfaces 102 by using the target output power corresponding to the target charging mode.

Figure 5:
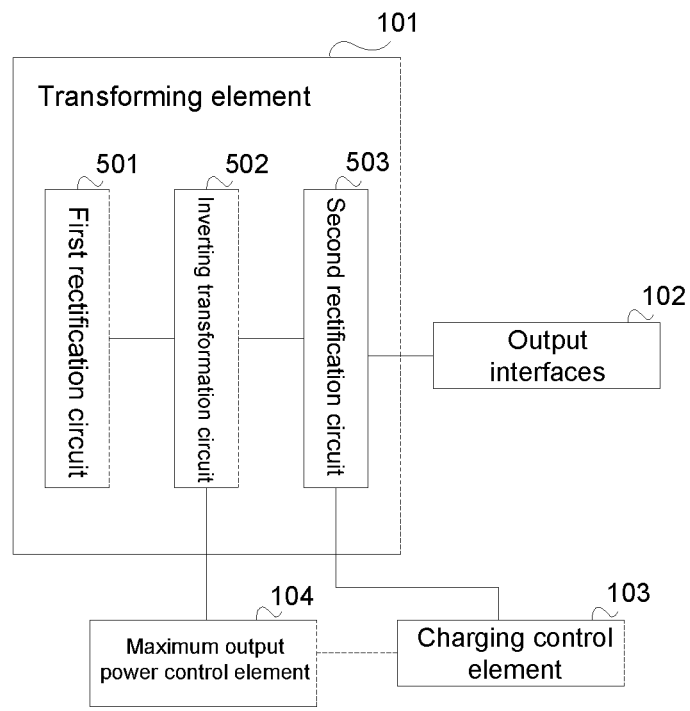
FIG. 5 is a structural schematic diagram of a charging apparatus according to a second embodiment of the present disclosure.

Based on the above embodiment, FIG. 5 is a structural schematic diagram of a charging apparatus according to an embodiment of the present disclosure. The transforming element 101 includes: a first rectification circuit 501, an inverting transformation circuit 502, and a second rectification circuit 503.

The first rectification circuit 501 is connected with the inverting transformation circuit 502, and the first rectification circuit 501 is configured to be connected with the power supply. The first rectification circuit 501 converts AC of the power supply to Direct Current (DC).

The inverting transformation circuit 502 is respectively connected with the maximum output power control element and the second rectification circuit 503. The inverting transformation circuit 502 converts the converted DC to AC according to the target maximum output power, and performs voltage transformation on the AC.

The second rectification circuit 503 is configured to be connected with the output interface and the charging control element 103. The second rectification circuit 503 rectifies the AC to obtain the target charging current and the target charging voltage for charging.

In some embodiments of the present disclosure, the first rectification circuit 501 in the transforming element 101 converts the AC input by the power supply to DC. The inverting transformation circuit 502 in the transforming element 101 is connected with the maximum output power control element 104. The inverting transformation circuit 502 converts the converted DC to AC according to the target maximum output power, and performs voltage reduction on the AC after conversion. The second rectification circuit 503 in the transforming circuit 101 rectifies the AC after voltage reduction to obtain the target charging current and the target charging voltage for charging.

The second rectification circuit 503 is connected with the output interface 102, and provides the target output power, which is determined according to the target charging current and the target charging voltage, to the charging device through the output interfaces 102.

In some embodiments of the present disclosure, when the maximum output power pre-saved corresponding to each charging mode in the maximum output power control element 104 is not the output power for charging the charging device, the maximum output powers saved in the maximum output power control element 104 corresponding to each charging mode is the same or different. In some embodiments, the maximum output powers saved in the maximum output power control element 104 corresponding to each charging mode are the same, that is, the maximum output power is saved in the maximum output power control element 104 now, and the saved maximum output power is the same as the existing output power; but in some embodiments of the present disclosure, multiple charging modes are provided for the user, the maximum output power saved in the maximum output power control element 104 is greater than the output power in the method known to the inventors.

In some embodiments of the present disclosure, the transforming element adjusts the target maximum output power to the target output power under the control of the charging control element, and charges the charging device through the output interfaces by using the target output power, so the occurrence of repeated recharging is prevented to some extent, and the service life of charging device is prolonged.

Third Embodiment

Figure 6:
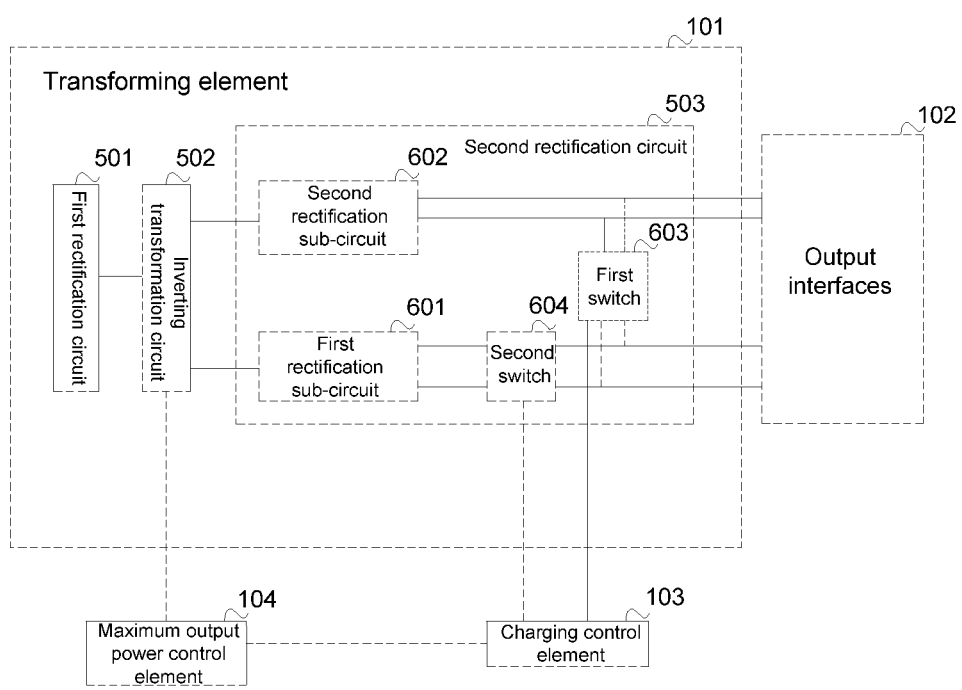
FIG. 6 is a structural schematic diagram of a charging apparatus according to a third embodiment of the present disclosure.

To further control the output target output power, based on the above embodiments, FIG. 6 is a structural schematic diagram of the charging apparatus according to an embodiment of the present disclosure. The second rectification circuit 503 includes: a first rectification sub-circuit 601, a second rectification sub-circuit 602, a first switch 603 and a second switch 604.

The second switch 604 is serially connected between the first rectification sub-circuit 601 and the output interface 102. The first end of the first switch 603 is connected with the second switch 604 and a first tandem connection point of one output interface 102. The second end of the first switch 603 is connected with the second rectification sub-circuit 602 and a second tandem connection point of one output interface 102.

The charging control element 103 is respectively connected with the first switch 603 and the second switch 604. The charging control element 103 is configured to control the first switch 603 and the second switch 604 to be opened or closed according to the target charging mode.

In some embodiments of the present disclosure, the first rectification sub-circuit 601 rectifies the AC after voltage reduction to obtain the first target charging current and target charging voltage for charging. The second rectification sub-circuit 602 rectifies the AC after voltage reduction to obtain the second target charging current and target charging voltage for charging. The first target charging current is the same as or different from the second target charging current.

A circuit structure of the first rectification sub-circuit 601 is the same as or different from the circuit structure of the second rectification sub-circuit 602, as long as the function of rectifying the AC after voltage reduction to obtain the target charging current and the target charging voltage for charging is implemented. It is believed that those skilled in the art determine the specific circuit structure according to the description of the rectification circuit in some embodiments of the present disclosure. The specific circuit structure of the rectification circuit is not described in some embodiments of the present disclosure.

The charging control element 103 determines, according to the target charging mode selected by the user, a first operating state of the first switch 603 corresponding to the target charging mode, and controls the first switch 603 to be opened or closed. The charging control element 103 determines, according to the target charging mode, a second operating state of the second switch 604 corresponding to the target charging mode, and controls the second switch 604 to be opened or closed.

The operating states of the switch are closed or opened. The working states of the first switch 603 corresponding to the different charging modes is the same or different. The working states of the second switch 604 corresponding to the different charging modes is the same or different. The opened or closed state of the first switch 603 and the opened or closed state of the second switch 604 will influence the target charging current output by the output interfaces 102.

Specifically, when the target charging mode is the fast charging mode, the charging control element 103 controls the first switch 603 to be closed, and controls the second switch 604 to be closed;

when the target charging mode is the standard charging mode, the charging control element 103 controls the first switch 603 to be opened and controls the second switch 604 to be closed;

when the target charging mode is the slow charging mode, the charging control element 103 controls the first switch 603 to be closed and controls the second switch 604 to be opened.

When the target charging mode selected by the user is the fast charging mode, the charging control element 103 controls the first switch 603 to be closed and controls the second switch 604 to be closed, the target charging current provided for the charging device by the output interfaces 102 is the sum of the first target charging current and the second target charging current, and the target output power for charging the charging device is determined according to the sum of the first target charging current and the second target charging current and the target charging voltage.

When the target charging mode selected by the user is the standard charging mode, the charging control element 103 controls the first switch 603 to be opened and controls the second switch 604 to be closed, the target charging current provided for the charging device by the output interfaces 102 is the first target charging current, and the target output power for charging the charging device is determined according to the first target charging current and the target charging voltage.

When the target charging mode selected by the user is the slow charging mode, the charging control element 103 controls the first switch 603 to be closed and controls the second switch 604 to be opened, the target charging current provided for the charging device by the output interfaces 102 is the second target charging current, and the target output power for charging the charging device is determined according to the second target charging current and the target charging voltage.

In some embodiments of the present disclosure, the charging control element realizes the control over the output target charging current by respectively controlling, according to the target charging mode, the first switch and the second switch to be opened and closed, thereby controlling the output target output power.

The correspondence relationship between the charging mode and the first operating state of the first switch 603 and the correspondence relationship between the charging mode and the second operating state of the second switch 604 is pre-saved in the charging control element 103, so that the first switch 603 and the second switch 604 are controlled to be opened or closed according to the target charging mode. Or, the charging control element 103 is a specific control circuit, and the control circuit controls the first switch 603 and the second switch 604 to be opened or closed according to the target charging mode.

Specifically, the charging control element 103 is composed of a first OR gate and a second OR gate. The first input end of the first OR gate and the first input end of the second OR gate are respectively connected with a fast charging mode button. The second input end of the first OR gate is connected with a standard charging mode button. The second input end of the second OR gate is connected with a slow charging mode button. The output end of the first OR gate is connected with the second switch. The output end of the second OR gate is connected with the first switch. When the OR gate outputs a high level signal, the switch is controlled to be closed. When the OR gate outputs a low level signal, the switch is controlled to be opened.

In addition, the target output powers provided for the charging device by the standard charging mode and the slow charging mode is the same or different. However, for the convenience of the user, the target output powers provided for the charging device by the standard charging mode and the slow charging mode are different, so it is required that the powers output to the first rectification sub-circuit and the second rectification sub-circuit by the inverting transformation circuit are different, which is realized by setting the number of turns of the coil, corresponding to the first rectification sub-circuit and the second rectification sub-circuit, in the transformer of the inverting transformation circuit.

Fourth Embodiment

Figure 7:
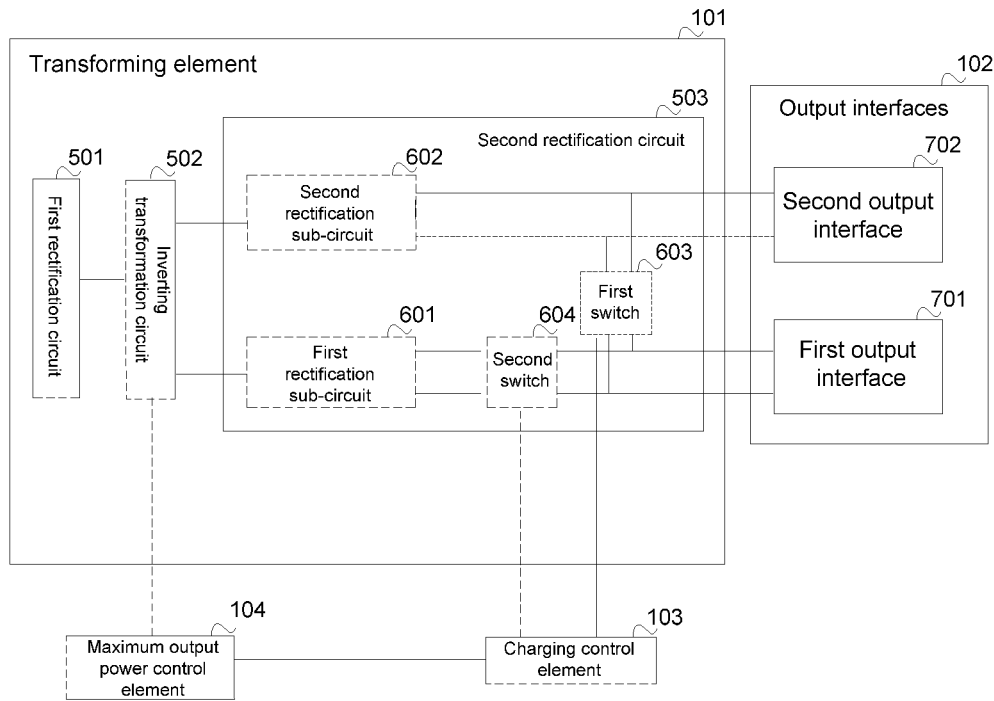
FIG. 7 is a structural schematic diagram of a charging apparatus according to a fourth embodiment of the present disclosure.

To further improve user experience, based on the above embodiments, FIG. 7 is a structural schematic diagram of the charging apparatus according to an embodiment of the present disclosure. The output interfaces 102 include: a first output interface 701 and a second output interface 702.

The second switch 604 is serially connected between the first rectification sub-circuit 601 and the first output interface 701, and the first output interface 701 is configured to be connected with the charging device. The first output interface 701 provides the first target charging current and the target charging voltage for the charging device according to the opened or closed state of the first switch 603 and the second switch 604.

The first end of the first switch 603 is connected with the second switch 604 and the first tandem connection point of the first output interface 701. The second end of the first switch 603 is connected with the second rectification sub-circuit 602 and the second tandem connection point of the second output interface 702, and the second output interface 702 is configured to be connected with the charging device. The second output interface 702 provides the second target charging current and the target charging voltage for the charging device.

When the target charging mode is a dual-channel charging mode, the charging control element 103 controls the first switch 603 to be opened, and controls the second switch 604 to be closed.

In some embodiments of the present disclosure, the charging apparatus provides two output interfaces, so it is possible to charge two pieces of charging device at the same time, or charge two batteries of the same charging device, thereby improving user experience.

The charging mode selection button according to the charging apparatus further includes the dual-channel charging mode. The correspondence relationship between the dual-channel charging mode and the operating state of the first switch 603 and the correspondence relationship between the dual-channel charging mode and the operating state of the second switch 604 are saved in the charging control element 103. When the target charging mode selected by the user is the dual-channel charging mode, the charging control element 103 controls the first switch 603 to be opened and controls the second switch 604 to be closed. The target charging current provided for the charging device by the first output interface 701 is the first target charging current, and the target charging current provided for the charging device by the second output interface 702 is the second target charging current. And the target output power for charging the charging device output by the first output interface 701 is determined according to the first target charging current and the target charging voltage, and the target output power for charging the charging device output by the second output interface 702 is determined according to the second target charging current and the target charging voltage.

In addition, the charging control element 103 is a specific control circuit. The control circuit controls the first switch 603 and the second switch 604 to be opened or closed according to the dual-channel charging mode. Specifically, based on the above embodiment, the first input end or the second input end of the first OR gate in the charging control element is connected with the dual-channel charging mode button. The second switch is controlled to be closed through the first OR gate.

As shown in FIG. 6 or FIG. 7, the first end and the second end of the first switch 603 are separately represented by two lines. For illustrating that the second rectification sub-circuit 602, the output interface 102, the charging device, the first switch 603 and the second rectification sub-circuit 602 form a loop. Similarly, as shown in FIG. 6 or FIG. 7, the first end and the second end of the second switch 604 are separately represented by two lines. For illustrating that the first rectification sub-circuit 601, the output interface 102, the charging device, the second switch 604 and the first rectification sub-circuit 601 form a loop.

In some embodiments of the present disclosure, the charging apparatus provides two output interfaces, so it is possible to charge two charging devices at the same time, or charge two batteries of the same charging device, thereby improving user experience.

Fifth Embodiment

Figure 8:
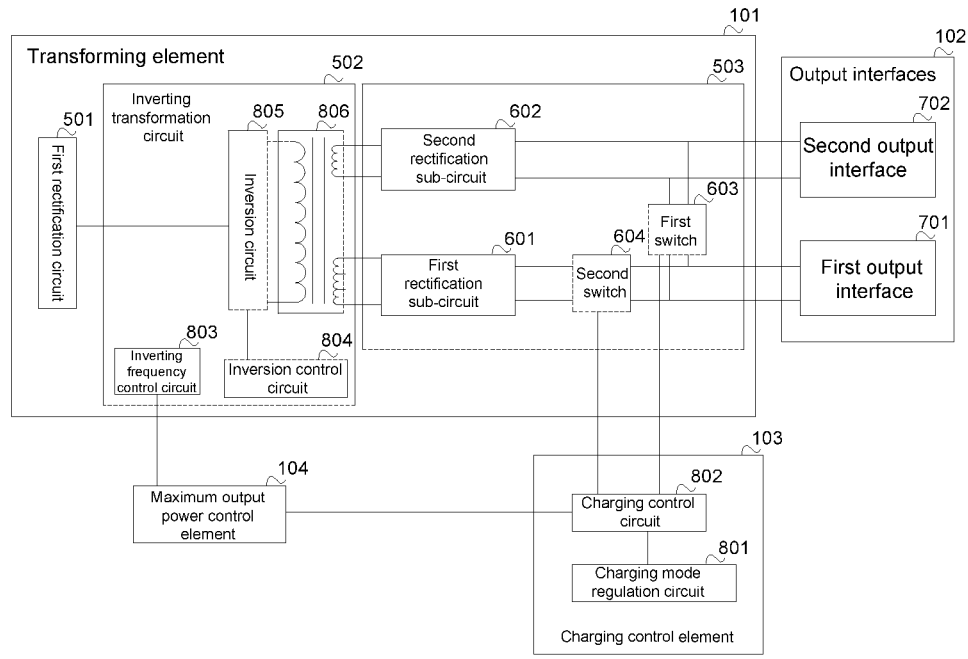
FIG. 8 is a structural schematic diagram of a charging apparatus according to a fifth embodiment of the present disclosure.

Based on the above embodiments, in some embodiments of the present disclosure, FIG. 8 is a structural schematic diagram of the charging apparatus according to an embodiment of the present disclosure. The charging apparatus further includes: a mode selection button arranged on the shell.

The charging control element 103 is connected with the mode selection button, and the charging control element 103 determines the target charging mode according to the mode selection button selected by the user.

The charging control element 103 includes a charging mode regulation circuit 801 and a charging control circuit 802.

The charging mode regulation circuit 801 is connected with the mode selection button.

The charging control circuit 802 is connected with the charging mode regulation circuit 801, and the charging control circuit 802 is connected with the maximum output power control element 104 and the transforming element 101. The charging mode regulation circuit 801 identifies the target charging mode selected by the user. The charging control circuit 802 sends the target charging mode to the maximum output power control element 104, and controls the first switch 603 and the second switch 604 to be opened or closed.

The maximum output power control element 104 receives the target charging mode, and determines the target maximum output power corresponding to the target charging mode according to the pre-saved correspondence relationship between the charging mode and the maximum output power.

The inverting transformation circuit 502 includes an inverting frequency control circuit 803, an inversion control circuit 804, an inversion circuit 805, and a transformer 806.

The inverting frequency control circuit 803 is connected with the maximum output power control element 104.

The inversion control circuit 804 is respectively connected with the inverting frequency control circuit 803 and the inversion circuit 805.

The inversion circuit 805 is respectively connected with the first rectification circuit 501 and the transformer 806.

The transformer 806 is connected with the second rectification circuit 503.

According to the target maximum output power, the inverting frequency control circuit 803 converts the current frequency to the target frequency corresponding to the target maximum output power of the transforming element 101. According to the target frequency received through the inversion control circuit 804, the inversion circuit 805 converts the DC after conversion to AC. The transformer 806 performs voltage reduction on the AC after conversion according to the target frequency.

In some embodiments of the present disclosure, the function of any one or several of the charging control circuit 802, the maximum output power control element 104, the inverting frequency control circuit 803 and the inversion control circuit 804 is integrated in a chip, and the corresponding function is completed by using one or several chips. A model of chip is IW1780. Certainly, those skilled in the art may also use other charging chips or fast charging chips capable of implementing the same function, which is not limited in some embodiments of the present disclosure.

As shown in FIG. 8, the mode selection button arranged on the shell is omitted. It is possible to arrange one mode selection button to realize the mode selection through different tap positions, or arrange one mode selection button corresponding to each charging mode, that is, multiple mode selection buttons are arranged. For example, the multiple mode selection buttons respectively corresponding to the fast charging mode, the slow charging mode, the standard charging mode and the dual-channel charging mode are arranged on the shell of the charging apparatus.

Some embodiments are illustrated below by using a specific example. The charging mode regulation circuit 801 in the charging control element 103 identifies the target charging mode selected by the user as the slow charging mode, and sends the target charging mode to the maximum output power control element 104 through the charging control circuit 802 in the charging control element 103. And the charging control circuit 802 controls the first switch 603 to be closed and controls the second switch 604 to be opened.

The maximum output power control element 104 determines the target maximum output power corresponding to the slow charging mode according to the received the target charging mode and the pre-saved correspondence relationship between the charging mode and the maximum output power.

The first rectification circuit 501 in the transforming element 101 converts the AC input by the power supply to DC. The inverting frequency control circuit 803 in the inverting transformation circuit 502 converts the current frequency to the target frequency according the target maximum output power. The inversion circuit 805 receives the target frequency through the inversion control circuit 804, and converts the DC after conversion to AC. A voltage reduction transformer 806 performs voltage reduction on the AC after conversion. Since the second switch 604 is opened, the second rectification sub-circuit 602 in the second rectification circuit 503 rectifies the AC after voltage reduction to obtain the second target charging current and the target charging voltage for charging. The first output interface 701 is connected with the charging device. The charging current provided for the charging device by the first output interface 701 is the second target charging current. The target output power for charging the charging device is determined according to the second target charging current and the target charging voltage.

In some embodiments of the present disclosure, the transforming element adjusts the target maximum output power to the target output power under the control of the charging control element, and charges the charging device through the output interface by using the target output power, so the occurrence of repeated recharging is prevented to some extent, and the service life of charging device is prolonged.

Sixth Embodiment

Figure 9:
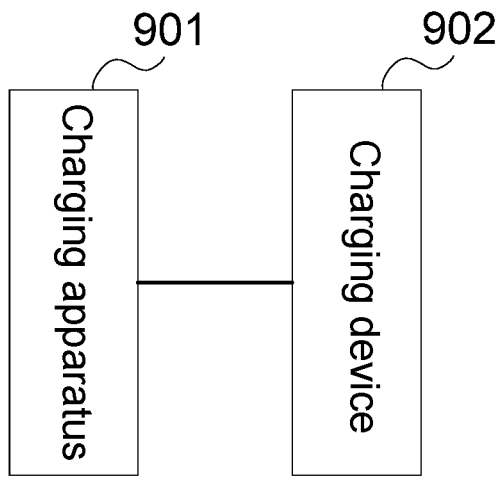
FIG. 9 is a structural schematic diagram of a charging system according to a sixth embodiment of the present disclosure.

FIG. 9 is a structural schematic diagram of a charging system according to the embodiment of the present disclosure. As shown in FIG. 9, the charging system includes a charging apparatus 901 and charging device 902 connected with the charging apparatus 901.

To prolong the service life of the charging device, the charging apparatus 901 in the system includes: the shell, the transforming element arranged in the shell, and the output interfaces arranged on the shell. The charging apparatus further includes: the charging control element and the maximum output power control element which are arranged in the shell. The charging control element is connected with the maximum output power control element, and the charging control element identifies the target charging mode selected by the user and sends the target charging mode to the maximum output power control element. The maximum output power control element is connected with the transforming element, and the maximum output power control element determines the target maximum output power corresponding to the target charging mode according to the pre-saved correspondence relationship between the charging mode and the maximum output power. The transforming element is connected with the output interfaces, and is configured to be connected with the power supply. The output interface is configured to be connected with the charging device 902. The transforming element obtains the target output power corresponding to the target charging mode according to the target maximum output power and charges the charging device 902 through the output interfaces by using the target output power.

The charging apparatus 901 in the system is connected with the charging device 902 through the output interfaces. After the charging device 902 is connected with the charging apparatus 901, the charging apparatus 901 charges the charging device 902. The charging apparatus 901 and the charging device 902 are connected as the schematic diagram of connection as shown in FIG. 4 or in the connection way known to the inventors.

The transforming element in the charging apparatus 901 includes: the first rectification circuit, the inverting transforming circuit, and the second rectification circuit. The first rectification circuit is connected with the inverting transforming circuit, and is configured to be connected with a power supply. The inverting transforming circuit is respectively connected with the maximum output power control element and the second rectification circuit. The second rectification circuit is configured to be connected with the output interface and the charging control element.

The second rectification circuit in the charging apparatus 901 includes: the first rectification sub-circuit, the second rectification sub-circuit, the first switch and the second switch. The second switch is serially connected between the first rectification sub-circuit and the output interfaces. The first end of the first switch is connected with the second switch and the first tandem connection point of one output interface. The second end of the first switch is connected with the second rectification sub-circuit and the second tandem connection point of the one output interface. The charging control element is respectively connected with the first switch and the second switch. The charging control element is configured to control the first switch and the second switch to be opened or closed according to the target charging mode.

When the target charging mode is the fast charging mode, the charging control element controls the first switch to be closed and controls the second switch to be closed. When the target charging mode is the standard charging mode, the charging control element controls the first switch to be opened and controls the second switch to be closed. When the target charging mode is the slow charging mode, the charging control element controls the first switch to be closed and controls the second switch to be opened.

The output interfaces in the charging apparatus 901 include: the first output interface and the second output interface. The second switched is serially connected between the first rectification sub-circuit and the first output interface, and the first output interface is configured to be connected with the charging device. The first end of the first switch is connected with the second switch and the first tandem connection point of the first output interface. The second end of the first switch is connected with the second rectification sub-circuit and the second tandem connection point of the second output interface, and the second output interface is configured to be connected with the charging device.

When the target charging mode is the dual-channel charging mode, the charging control element controls the first switch to be opened and controls the second switch to be closed.

The charging apparatus 901 further includes: the mode selection button arranged on the shell. The charging control element is connected with the mode selection button, and the charging control element determines the target charging mode according to the mode selection button selected by the user.

The charging control element in the charging apparatus 901 includes the charging mode regulation circuit and the charging control circuit. The charging mode regulation circuit is connected with the mode selection button. The charging control circuit is connected with the charging mode regulation circuit, and is connected with the maximum output power control element and the transforming element.

The inverting transformation circuit in the charging apparatus 901 includes the inverting frequency control circuit, the inversion control circuit, the inversion circuit, and the transformer. The inverting frequency control circuit is connected with the maximum output power control element. The inversion control circuit is respectively connected with the inverting frequency control circuit and the inversion circuit. The inversion circuit is respectively connected with the first rectification circuit and the transformer. The transformer is connected with the second rectification circuit.

The charging apparatus of the charging system provided in some embodiments of the present disclosure determines the target maximum output power according to the identified target charging mode selected by the user, obtains the target output power corresponding to the target charging mode according to the target maximum output power, and charges the charging device by using the target output power. In such a manner, the occurrence of repeated recharging is prevented to some extent, and the service life of charging device is prolonged.

Seventh Embodiment

Figure 10:
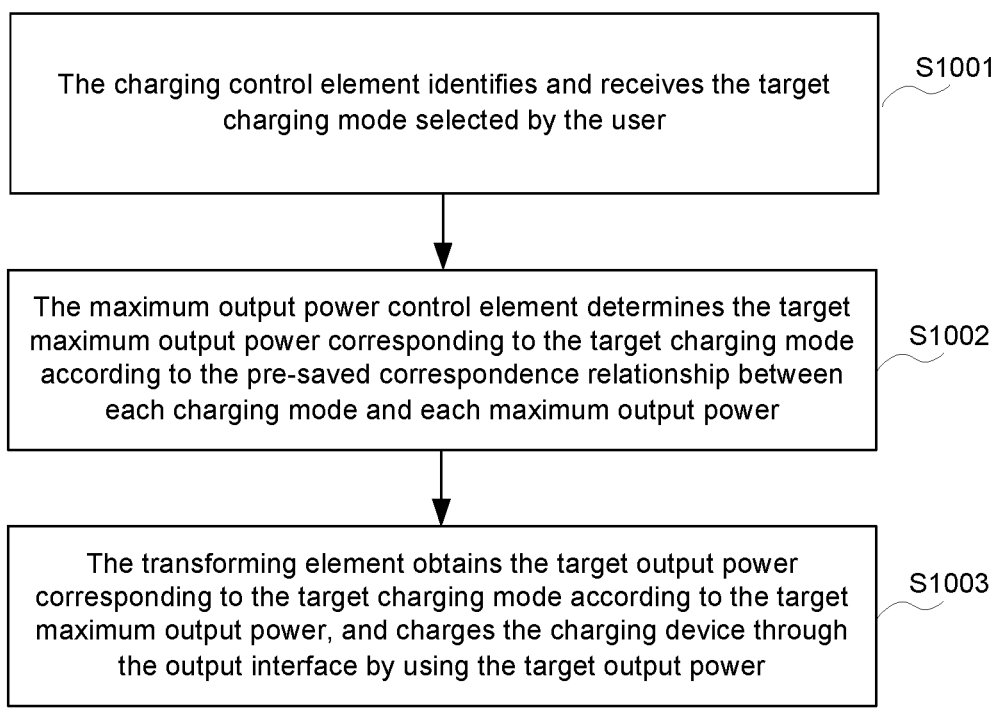
FIG. 10 is a schematic diagram of a charging control process according to a seventh embodiment of the present disclosure.

FIG. 10 is a schematic diagram of a charging control process according to an embodiment of the present disclosure. The process includes the following steps.

At step S1001, the charging control element identifies and receives the target charging mode selected by the user.

The charging control method in some embodiments of the present disclosure is applied to the charging apparatus, and the charging control method is implemented based on the charging device in some embodiments. The charging apparatus charges the charging device, and the charging apparatus receives the target charging mode selected by the user.

The charging apparatus in some embodiments of the present disclosure includes the charging control element.

The charging modes provided in some embodiments of the present disclosure include the fast charging mode, the slow charging mode, and the standard charging mode.

The user selects the target charging mode through the mode selection button arranged on the shell of the charging apparatus. It is possible to arrange one mode selection button to realize the mode selection through different tap positions, or arrange one mode selection button corresponding to each charging mode. That is, multiple mode selection buttons are arranged. For example, the multiple mode selection buttons corresponding to the fast charging mode, the slow charging mode, and the standard charging mode are arranged on the shell of the charging apparatus.

The charging control element identifies the target charging mode selected by the user according to the mode selection button selected by the user.

At step S1002, the maximum output power control element determines the target maximum output power corresponding to the target charging mode according to the pre-saved correspondence relationship between each charging mode and each maximum output power.

The charging apparatus in some embodiments of the present disclosure further includes the maximum output power control element. The maximum output power control element is connected with the charging control element. The correspondence relationship between the charging mode and the maximum output power is pre-saved in the maximum output power control element, so the maximum output power corresponding to the target charging mode is determined according to the target charging mode selected by the user. The maximum output power control element saves the same maximum output power corresponding to each charging mode, or save the different maximum output powers corresponding to each charging mode.

At step S1003, the transforming element obtains the target output power corresponding to the target charging mode according to the target maximum output power, and charges the charging device through the output interface by using the target output power.

The charging apparatus in some embodiments of the present disclosure further includes the transforming element and the output interface. The transforming element is connected with the maximum output power control element and the output interface. The transforming element receives the target maximum output power determined by the maximum output power control element, obtains the target output power corresponding to the target charging mode, and charges the charging device through the output interface.

In some embodiments of the present disclosure, the charging device is a device to be charged through the charging apparatus, for example, a PC or a mobile terminal.

Specifically, when the charging device is charged, after the maximum output power is determined, a charging frequency is determined according to the maximum output power. According to the charging frequency, a corresponding charging current is determined, and the charging device is charged by using the charging current and a charging voltage obtained after voltage reduction. Therefore, in some embodiments of the present disclosure, the charging apparatus determines the target frequency according to the target maximum output power, determines the target charging current according to the target frequency, and obtains the target charging voltage after converting and reducing the voltage input by the power supply. The target charging current and the target charging voltage correspond to the target output power. The transforming element 101 outputs the target output power corresponding to the target charging mode, and charges the charging device through the output interface by using the target output power. The target charging voltage is the voltage allowed by the charging device when the charging device is charged. The voltage value of the target charging voltage is the same as the voltage value during charging the charging device in the method known to the inventors.

The number of turns of the coil in the charging apparatus is generally fixed, the current is adjusted by converting the frequency, and then the target output power corresponding to the target charging mode is output through the output interface according to the adjusted target charging current and the target charging voltage after voltage reduction.

In some embodiments of the present disclosure, the charging apparatus determines the target maximum output power according to the received target charging mode selected by the user, obtains the target output power corresponding to the target charging mode according to the target maximum output power, and charges the charging device through the output interface by using the target output power. In such a manner, the occurrence of repeated recharging is prevented to some extent, and the service life of charging device is prolonged.

Eighth Embodiment

To further control the output target output power, based on the above embodiments, that the transforming element charges the charging device through the output interfaces according to the target maximum output power in some embodiments of the present disclosure includes the following operations.

When the target maximum output power is the target output power corresponding to the target charging mode, the transforming element determines the target maximum output power as the target output power.

When the target maximum output power is not the target output power corresponding to the target charging mode, the transforming element adjusts the target maximum output power to the target output power under the control of the charging control method.

In the maximum output power control element of some embodiments of the present disclosure, the target maximum output power saved corresponding to the target charging mode is equal or unequal to the actual target output power for charging. When the target maximum output power is the target output power corresponding to the target charging mode, the transforming element directly charges the charging device through the output interfaces according to the target output power.

That when the maximum output power is not the target output power corresponding to the target charging mode, the transforming element adjusts the maximum output power to the target output power under the control of the charging control method includes the following operation.

The charging control element controls, according to the target charging mode, the first switch and the second switch to be opened and closed, so that the transforming element adjusts the target maximum output power to the target output power. The transforming element includes the first switch and the second switch which are connected with the output interfaces, and the first switch and the second switch are connected with a corresponding transforming rectification circuit.

The correspondence relationship between the charging mode and the first operating state of the first switch and the correspondence relationship between the charging mode and the second operating state of the second switch is pre-saved in the charging control element, so that the first switch and the second switch are controlled to be opened or closed according to the target charging mode. Or, the charging control element is a specific control circuit, and the control circuit controls the first switch and the second switch to be opened or closed according to the target charging mode.

Specifically, the transforming rectification circuit includes the first rectification circuit, the inverting transformation circuit, the first rectification sub-circuit and the second rectification sub-circuit. The first rectification circuit is connected with the inverting transformation circuit, and the first rectification circuit is configured to be connected with the power supply.

The inverting transformation circuit is respectively connected with the maximum output power control element, the first rectification sub-circuit, and the second rectification sub-circuit. The second switch is serially connected between the first rectification sub-circuit and the output interface. The first end of the first switch is connected with the second switch and the first tandem connection point of one output interface. The second end of the first switch is connected with the second rectification sub-circuit and the second tandem connection point of the one output interface.

The charging control element is respectively connected with the first switch and the second switch. The charging control element is configured to control the first switch and the second switch to be opened or closed according to the target charging mode.

Specifically, that the charging control element controls, according to the target charging mode, the first switch and the second switch to be opened and closed includes the following operations.

When the target charging mode is the fast charging mode, the charging control element controls the first switch to be closed and controls the second switch to be closed.

When the target charging mode is the standard charging mode, the charging control element controls the first switch to be opened and controls the second switch to be closed.

When the target charging mode is the slow charging mode, the charging control element controls the first switch to be closed and controls the second switch to be opened.

Specifically, the charging control element is composed of the first OR gate and the second OR gate. The first input end of the first OR gate and the first input end of the second OR gate are respectively connected with the fast charging mode button. The second input end of the first OR gate is connected with the standard charging mode button. The second input end of the second OR gate is connected with the slow charging mode button. The output end of the first OR gate is connected with the second switch. And the output end of the second OR gate is connected with the first switch. When the OR gate outputs a high level signal, the switch is controlled to be closed. When the OR gate outputs a low level signal, the switch is controlled to be opened.

In addition, the target output powers provided for the charging device by the standard charging mode and the slow charging mode are the same or different, but for the convenience of the user, the target output powers provided for the charging device by the standard charging mode and the slow charging mode are different, so it is required that the powers output to the first rectification sub-circuit and the second rectification sub-circuit by the inverting transformation circuit are different, which is realized by setting the number of turns of the coil, corresponding to the first rectification sub-circuit and the second rectification sub-circuit, in the transformer of the inverting transformation circuit.

The output interfaces include the first output interface and the second output interface.

The second switched is serially connected between the first rectification sub-circuit and the first output interface, and the first output interface is configured to be connected with the charging device.

The first end of the first switch is connected with the second switch and the first tandem connection point of the first output interface, the second end of the first switch is connected with the second rectification sub-circuit and the second tandem connection point of the second output interface, and the second output interface is configured to be connected with the charging device.

That the charging control element controls, according to the target charging mode, the first switch and the second switch to be opened and closed includes the following operation.

When the target charging mode is the dual-channel charging mode, the charging control element controls the first switch to be opened, and controls the second switch to be closed. The output interface includes the first output interface and the second output interface. The second switch is connected with the first output interface and the transforming rectification circuit corresponding to the second switch. The first switch is connected with the transforming rectification circuit corresponding to the first switch, and is connected with the first output interface. The transforming rectification circuit corresponding to the first switch is connected with the second output interface.

For some system embodiments or some device embodiments, since these embodiments basically similar to some method embodiments, the description is relatively simple, and the relevant parts are referred to the description of the method embodiments.

Those skilled in the art should understand that the embodiments of the present disclosure may be provided as a method, a system or a computer program product. Thus, some embodiments of the present disclosure may adopt forms of complete hardware embodiments, complete software embodiments or embodiments integrating software and hardware. Moreover, some embodiments of the present disclosure may adopt the form of a computer program product implemented on one or more computer available storage media (including, but not limited to, a disk memory, a CD-ROM, an optical memory and the like) containing computer available program codes.

The present disclosure is described with reference to flowcharts and block diagrams, or flowcharts, or block diagrams of the method, the device (system) and the computer program product according to at least some embodiments of the present disclosure. It should be understood that each flow in the flowchart, or each block in block diagram and the combination of the flow in the flowchart and the block in the block diagram are implemented by the computer program instructions. These computer program instructions are provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in at least one flow of the flowchart and at least one block of the block diagram, or at least one flow of the flowchart, or at least one block of the block diagram.

These computer program instructions may also be stored in the computer-readable memory which guides the computer or other programmable data processing devices to work in a particular way, so that the instructions stored in the computer-readable memory generate a product including an instruction device. The instruction device implements the specified functions in at least one flow of the flowchart and at least one block of the block diagram, or at least one flow of the flowchart, or at least one block of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in at least one flow of the flowchart and at least one block of the block diagram, or at least one flow of the flowchart, or at least one block of the block diagram.

While some embodiments of the present disclosure have been described, those skilled in the art make additional changes and modifications to the embodiments once knowing a basic creativity concept. Therefore, the appended claims are intended to be interpreted as including the some embodiments and all the changes and modifications falling within the scope of the present disclosure.

It is apparent that those skilled in the art make various modifications and variations to the present disclosure without departing from the spirit and scope of the present disclosure. Thus, when such modifications and variations of the present disclosure fall within the scope of the appended claims and their equivalents, the present disclosure is also intended to cover the modifications and variations.

What is claimed:

1. A charging apparatus, comprising: a shell, a transforming element arranged in the shell, and output interfaces arranged on the shell, wherein the charging apparatus further comprises: a charging control element and a maximum output power control element which are arranged in the shell;

the charging control element is connected with the maximum output power control element, and the charging control element is configured to identify a target charging mode selected by a user and send the target charging mode to the maximum output power control element;

the maximum output power control element is connected with the transforming element, and the maximum output power control element is configured to determine a target maximum output power corresponding to the target charging mode according to a pre-saved correspondence relationship between each charging mode and each maximum output power;

the transforming element is connected with the output interfaces, and the transforming element is configured to obtain a target output power according to the target maximum output power and charge a charging device through the output interfaces by using the target output power;

wherein the transforming element comprises: a first rectification circuit, an inverting transformation circuit, and a second rectification circuit;

wherein the second rectification circuit comprises: a first rectification sub-circuit, a second rectification sub-circuit, a first switch and a second switch; wherein the second switch is serially connected between the first rectification sub-circuit and the output interfaces; a first end of the first switch is connected with the second switch and a first tandem connection point of one output interface, and a second end of the first switch is connected with the second rectification sub-circuit and a second tandem connection point of the one output interface; the charging control element is respectively connected with the first switch and the second switch, and the charging control element is configured to control the first switch and the second switch to be opened or closed according to the target charging mode.

2. The charging apparatus as claimed in claim 1, wherein the first rectification circuit is connected with the inverting transformation circuit, and is configured to be connected with a power supply;
the inverting transformation circuit is respectively connected with the maximum output power control element and the second rectification circuit; and
the second rectification circuit is configured to be connected with the output interfaces and the charging control element.

3. The charging apparatus as claimed in claim 1, wherein
when the target charging mode is a fast charging mode, the charging control element is configured to control the first switch to be closed and control the second switch to be closed;
when the target charging mode is a standard charging mode, the charging control element is configured to control the first switch to be opened and control the second switch to be closed;
when the target charging mode is a slow charging mode, the charging control element is configured to control the first switch to be closed and control the second switch to be opened.

4. The charging apparatus as claimed in claim 1, wherein the output interfaces comprise: a first output interface and a second output interface;
the second switched is serially connected between the first rectification sub-circuit and the first output interface, and the first output interface is configured to be connected with the charging device;
the first end of the first switch is connected with the second switch and a first tandem connection point of the first output interface, the second end of the first switch is connected with the second rectification sub-circuit and a second tandem connection point of the second output interface, and the second output interface is configured to be connected with the charging device.

5. The charging apparatus as claimed in claim 4, wherein when the target charging mode is a dual-channel charging mode, the charging control element is configured to control the first switch to be opened and control the second switch to be closed.

6. The charging apparatus as claimed in claim 1, further comprising: a mode selection button arranged on the shell;
the charging control element is connected with the mode selection button, and the charging control element is configured to determine the target charging mode according to the mode selection button selected by a user.

7. The charging apparatus as claimed in claim 6, wherein the charging control element comprises a charging mode regulation circuit and a charging control circuit;
the charging mode regulation circuit is connected with the mode selection button;
the charging control circuit is connected with the charging mode regulation circuit, and is connected with the maximum output power control element and the transforming element.

8. The charging apparatus as claimed in claim 7, wherein the inverting transformation circuit comprises an inverting frequency control circuit, an inversion control circuit, an inversion circuit, and a transformer;
the inverting frequency control circuit is connected with the maximum output power control element;
the inversion control circuit is respectively connected with the inverting frequency control circuit and the inversion circuit;
the inversion circuit is respectively connected with the first rectification circuit and the transformer; and
the transformer is connected with the second rectification circuit.

9. A charging system, comprising: a charging apparatus as claimed in claim 1, and a charging device connected with the charging apparatus.

10. A charging control method for a charging apparatus as claimed in claim 1, comprising:
identifying, by a charging control element, a target charging mode selected by a user;
determining, by a maximum output power control element, a target maximum output power corresponding to the target charging mode according to a pre-saved correspondence relationship between each charging mode and each maximum output power; and
obtaining, by a transforming element, a target output power corresponding to the target charging mode according to the target maximum output power, and charging a charging device through output interfaces by using the target output power.

11. The charging control method as claimed in claim 10, wherein charging, by the transforming element, the charging device through the output interfaces according to the target maximum output power comprises:
when the target maximum output power is the target output power corresponding to the target charging mode, determining, by the transforming element, the target maximum output power as the target output power;
when the target maximum output power is not the target output power corresponding to the target charging mode, adjusting, by the transforming element, the target maximum output power to the target output power under the control of the charging control element.

12. The charging control method as claimed in claim 11, wherein when the target maximum output power is not the target output power corresponding to the target charging mode, adjusting the target maximum output power to the target output power under the control of the charging control method comprises:
controlling according to the target charging mode, by the charging control element, a first switch and a second switch to be opened and closed, so that the transforming element adjusts the target maximum output power to the target output power, wherein the transforming element comprises the first switch and the second switch which are connected with output interfaces, and the first switch and the second switch are respectively connected with a corresponding transforming rectification circuit.

13. The charging control method as claimed in claim 12, wherein controlling according to the target charging mode, by the charging control element, the first switch and the second switch to be opened and closed comprises:

when the target charging mode is a fast charging mode, controlling, by the charging control element, the first switch to be closed and controlling the second switch to be closed;

when the target charging mode is a standard charging mode, controlling, by the charging control element, the first switch to be opened and controlling the second switch to be closed;

when the target charging mode is a slow charging mode, controlling, by the charging control element, the first switch to be closed and controlling the second switch to be opened.

14. The charging control method as claimed in claim 12, wherein controlling according to the target charging mode, by the charging control element, the first switch and the second switch to be opened and closed comprises:

when the target charging mode is a dual-channel charging mode, controlling, by the charging control element, the first switch to be opened and controlling the second switch to be closed, wherein the output interfaces comprises a first output interface and a second output interface, the second switch is connected with the first output interface and the transforming rectification circuit corresponding to the second switch, the first switch is connected with the transforming rectification circuit corresponding to the first switch, and is connected with the first output interface, the transforming rectification circuit corresponding to the first switch is connected with the second output interface.

* * * * *